United States Patent
Imai et al.

(10) Patent No.: US 8,151,065 B2
(45) Date of Patent: Apr. 3, 2012

(54) MEMORY CONTROL DEVICE AND SEMICONDUCTOR PROCESSING APPARATUS

(75) Inventors: Rintaro Imai, Tokyo (JP); Satoshi Nakano, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 811 days.

(21) Appl. No.: 12/237,208

(22) Filed: Sep. 24, 2008

(65) Prior Publication Data

US 2009/0089517 A1  Apr. 2, 2009

(30) Foreign Application Priority Data

Sep. 27, 2007  (JP) ................................ 2007-251591

(51) Int. Cl.
*G06F 13/16* (2006.01)
(52) U.S. Cl. ........ 711/154; 708/273; 711/150; 711/167; 711/168

(58) Field of Classification Search .................. 711/154, 711/150, 167, 168; 708/273
See application file for complete search history.

(56) References Cited

U.S. PATENT DOCUMENTS
5,581,745 A * 12/1996 Muraoka et al. .............. 713/502

FOREIGN PATENT DOCUMENTS
JP  2000-010856 A  1/2000

* cited by examiner

*Primary Examiner* — Jae Yu
(74) *Attorney, Agent, or Firm* — Miles & Stockbridge P.C.

(57) ABSTRACT

The present invention provides a memory control device and a semiconductor processing apparatus which can be flexibly made adapted to a plurality of kinds of semiconductor memories. An SDRAM controller has: a register unit to which a command to be issued and a minimum interval (wait time) between issue of the command and issue of the next command are written by a CPU; and a command issuing unit that stops issue of the next command until the minimum interval written in the register elapses since issue of the command written in the register. Therefore, by changing software for the CPU, the SDRAM controller can be flexibly adapted to a plurality of kinds of SDRAMs.

5 Claims, 8 Drawing Sheets

MEMORY CONTROL DEVICE AND SEMICONDUCTOR PROCESSING APPARATUS

CROSS-REFERENCE TO RELATED APPLICATIONS

The disclosure of Japanese Patent Application No. 2007-251591 filed on Sep. 27, 2007 including the specification, drawings and abstract is incorporated herein by reference in its entirety.

BACKGROUND OF THE INVENTION

The present invention relates to a memory control device and a semiconductor processing apparatus and, more particularly, relates to a memory control device and a semiconductor processing apparatus for controlling a semiconductor memory by using a series of commands.

Hitherto, an image processing apparatus for compressing/decompressing an image is provided with an SDRAM (Synchronous Dynamic Random Access Memory) for storing a large amount of data, and an SDRAM controller for controlling the SDRAM (refer to, for example, Japanese Unexamined Patent Publication No. 2000-10856).

In the control of the SDRAM, for initialization at the time of power-on, a change in the drive frequency, return to a normal mode from a low-power mode, calibration, or the like, a command issuing sequence for issuing a series of SDRAM commands at sufficient intervals has to be execute. As a limitation of the command intervals, usually, only the minimum value is specified. Concrete length of the minimum interval varies from a few cycles to hundreds of microseconds (tens of thousands of cycles).

As a first method of executing the command issuing sequence, the SDRAM controller is provided with a controller as dedicated hardware (state machine) and the sequence is automatically executed by the controller.

As a second method of executing the command issuing sequence, an instruction to issue an SDRAM command is given from an external controller to the SDRAM controller to make the SDRAM controller issue an SDRAM command. In the second method, by repeatedly giving the command issue instruction from the external controller, the command issuing sequence is executed.

SUMMARY OF THE INVENTION

The first method has, however, a disadvantage from the viewpoint of adaptation to a plurality of kinds of SDRAMs. The command issuing sequence varies according to the kinds of SDRAMs and also slightly varies among manufacturers.

The sequence of calibration or the like is complicated and the strategies to be employed also vary according to a system to which the sequence is assembled. The controller realized by fixed hardware is not flexible.

In the second method, a method of accurately setting the intervals of SDRAM commands is an issue. When the interval from an SDRAM command to the next SDRAM command is measured by an external controller, the following problems occur.

There are many factors to be considered in order to assure a sufficient command interval, and the function is spread to a number of modules. Consequently, the specifications of the external controller are complicated, and it is also difficult to perform verification. Software is excessively complicated, and it causes deterioration in readability and maintenance.

The process load on the external controller also increases. Since the unpredictable part is large, when a sufficient margin is assured, the device waits more than necessary.

A main object of the present invention is therefore to provide a memory control device and a semiconductor processing apparatus which can be flexibly adapted to a plurality of kinds of semiconductor memories.

The present invention provides a memory control device for controlling a semiconductor memory by issuing a series of commands and including a register and a command issuing unit. To the register, a command to be issued and wait time for issue of the next command since the command is issued are written by an external control device. The command issuing unit stops issuing the next command until the wait time written in the register elapses after the command written in the register is issued.

A semiconductor processing apparatus of the invention includes a system bus, a CPU, and a memory control device. The CPU is coupled to the system bus. The memory control device is coupled to the system bus and receives command information from the CPU and time interval information that specifies a time interval as a wait time of the command information until the next command information is issued to an external semiconductor memory. The memory control device includes a register for storing the command information and the time interval information. The register receives the command and the time interval which are output to the system bus, and stores them in a coupled state.

In the memory control device and the semiconductor processing apparatus according to the present invention, when a command to be issued and wait time for issue of the next command since the command is issued are written in the register by an external control device such as a CPU, issue of the next command is stopped until the wait time written in the register elapses after the command written in the register is issued. Therefore, by changing software of the external control unit, the memory control device and the semiconductor processing apparatus can be made flexibly adapted to a plurality of kinds of semiconductor memories. Since the interval of commands is controlled by the memory control device, the load on the external control device can be lessened.

DETAILED DESCRIPTION OF THE PREFERRED EMBODIMENTS

Figure 1:
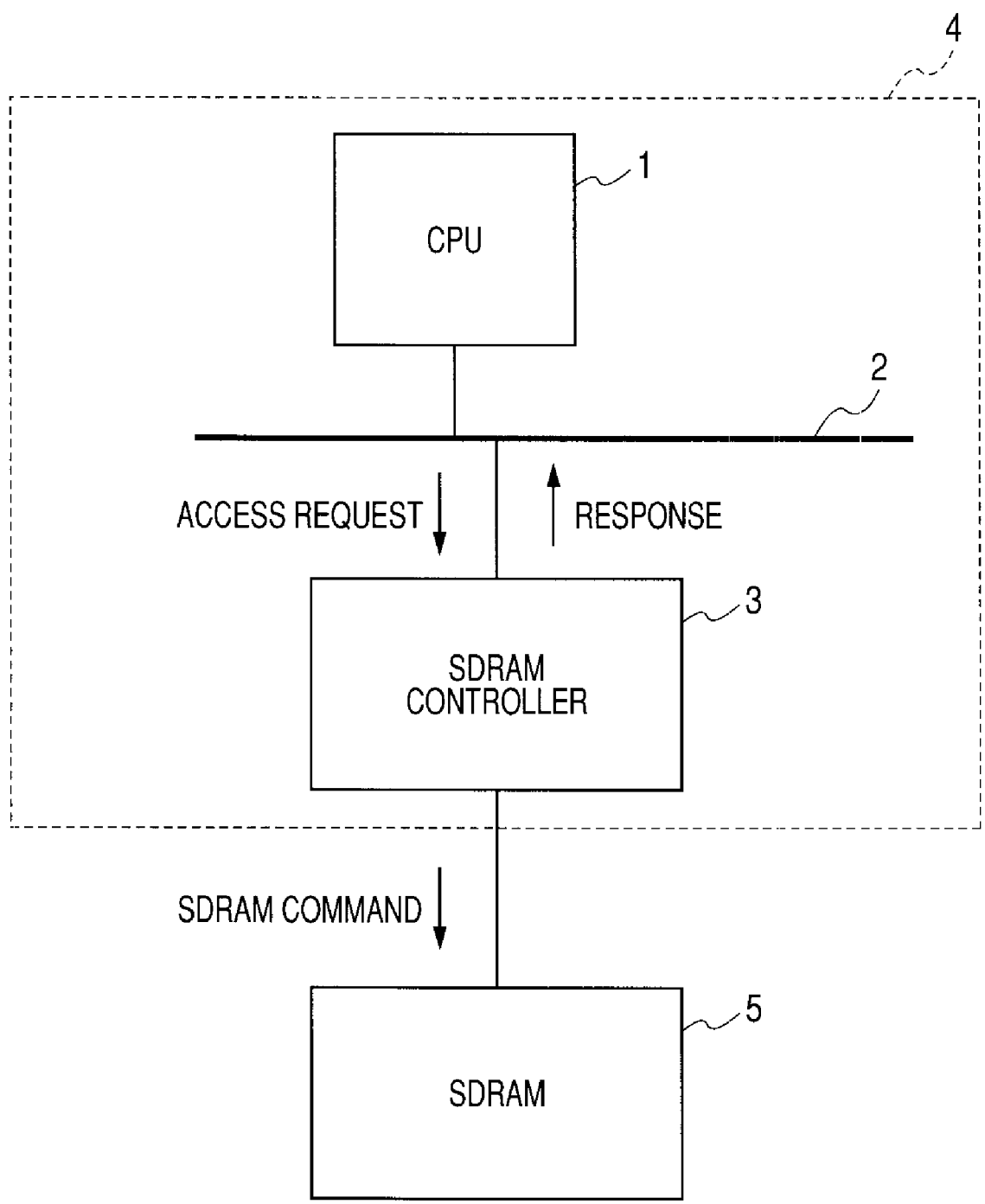
FIG. 1 is a block diagram showing main components of a memory system as an embodiment of the present invention.

FIG. 1 is a block diagram showing main components of a memory system as an embodiment of the present invention. In FIG. 1, the memory system has a semiconductor processing apparatus 4 including a CPU (Central Processing Unit) 1, a system bus 2, and an SDRAM controller 3, and an SDRAM 5. The "SDRAM" is a generic term of various SDRAMS such as SDR (Single Data Rate), DDR (Double Data Rate), LP (Low Power)-DDR, DDR2, and DDR3.

Figure 2:
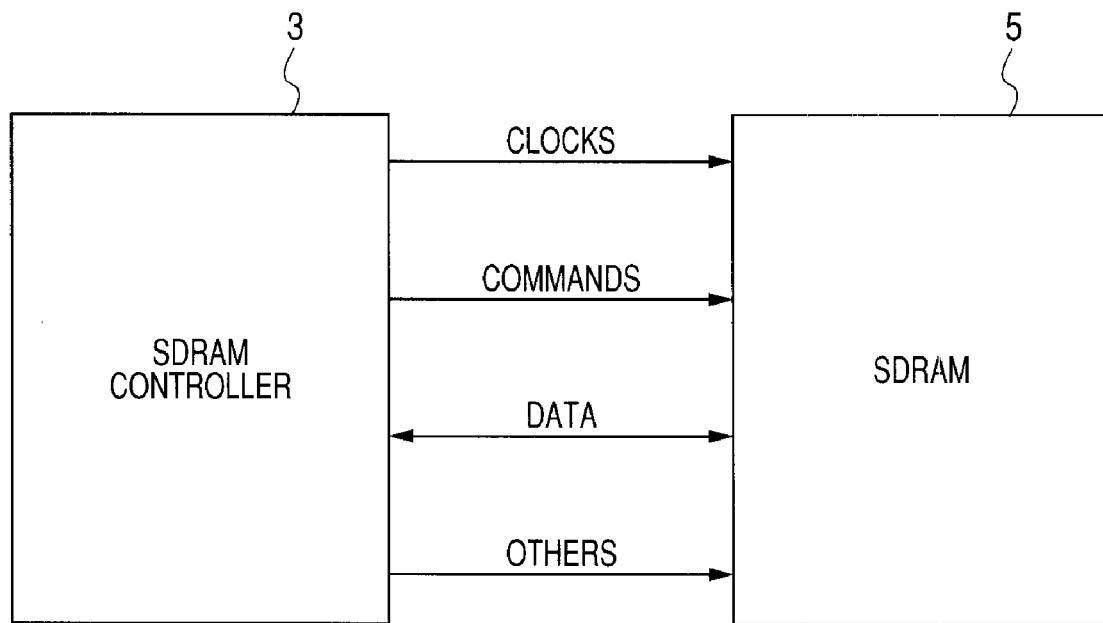
FIG. 2 is a block diagram for explaining signals transmitted/received between an SDRAM controller and an SDRAM shown in FIG. 1.

Signals between the SDRAM controller 3 and the SDRAM 5 can be classified to clocks, commands, data, and the others as shown in FIG. 2. The clock is a signal as a reference of the operation timing of the SDRAM 5. The command signals include a clock enable signal CKE, a chip select signal CS#, a row address/strobe signal RAS#, a column address/strobe signal CAS#, a write enable signal WE#, an address signal A, and a bank address signal BA. The data signals include a data signal DQ, a signal DQS indicative of an output timing of the data signal DQ, and a data mask signal DM. The other signals include a reset signal RESET# for initializing a control circuit at power-on, a signal ODT for turning on/off a terminating resistor of a data output line, and the like.

The SDRAM command is an instruction to the SDRAM 5, expressed by a combination of command signals input to the SDRAM synchronously with clocks. As also described in the background art, at power-on or at the time of return from the low-power mode, the SDRAM controller 3 has to output a series of SDRAM commands to the SDRAM 5 at sufficient time intervals. As the limitation of the command intervals, usually, only the minimum value is specified. Concrete length of the minimum interval varies from a few cycles to hundreds of microseconds (tens of thousands of cycles).

The kinds of the SDRAM commands necessary for the command issuing sequence of the present invention include mode register set, precharge all banks, refresh, ZQ calibration, CKE operation, and the like. The CKE operation includes power down entry, power down exit, self-refresh entry, self-refresh exit, and the like. In addition, an operation of a RESET# terminal is also necessary in some cases.

Figure 3:
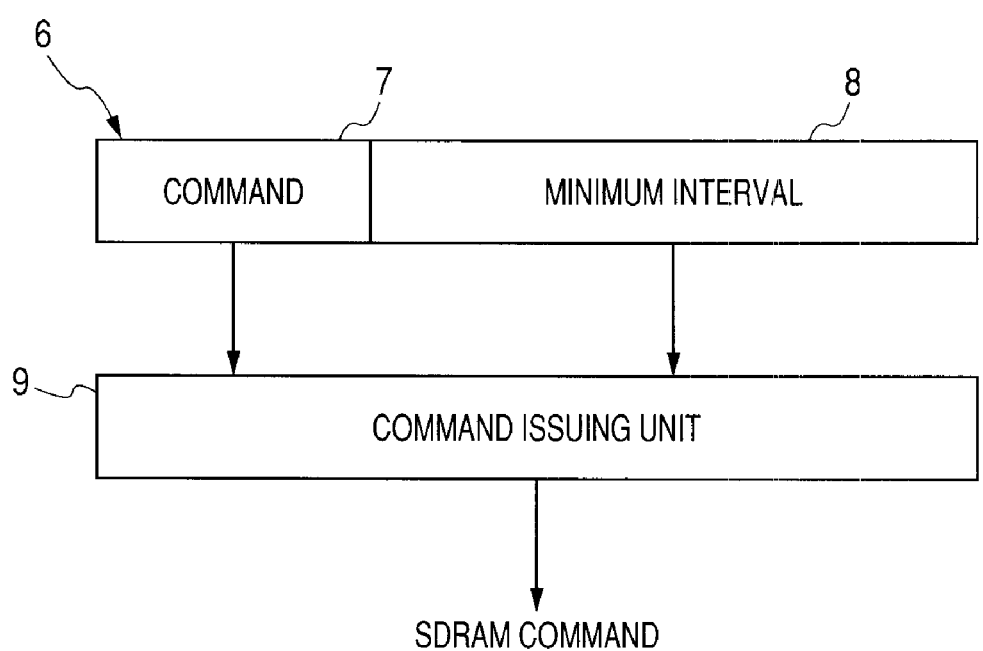
FIG. 3 is a block diagram showing a schematic configuration of the SDRAM controller illustrated in FIG. 1.

FIG. 3 is a diagram showing the configuration of the principle of the SDRAM controller 3. In FIG. 3, the SDRAM controller 3 includes a register unit 6 and a command issuing unit 9. The register unit 6 includes a first storage 7 for storing a first signal indicative of an SDRAM command to be issued, and a second storage 8 for storing a second signal indicative of the minimum interval in which the register unit 6 is to wait since the SDRAM command indicated by the first signal written in the first storage 7 is issued until the next SDRAM command is issued. Each of the first and second signals includes a data signal made of a plurality of bits. The storages 7 and 8 may be formed by storage devices as hardware, or software storage areas assigned to specified addresses to/from which data is written/read by the CPU 1.

According to a program stored in a not-shown memory, the CPU 1 sequentially writes a plurality of sets of first and second signals to the register unit 6 to make the SDRAM controller 3 issue the series of SDRAM commands. In the case where the bit widths of the register unit 6 and the system bus 2 are the same, the CPU 1 writes the set of the command and the "minimum interval" in a coupled state into the register unit 6. For example, when the bit width of the register unit 6 is 64 bits and the bit width of the system bus 2 is 32 bits, the CPU 1 writes data of 32 bits twice into the register unit 6 so as to maintain the coupled state. In the register unit 6, the command and the "minimum interval" is held in a state where the command and the "minimum interval" are coupled.

Since the storage capacity of the register unit 6 is limited, when the storages 7 and 8 do not have a free space, the register unit 6 side has to make CPU 1 wait. Consequently, the CPU 1 sends a write request to the register unit 6. When the storages 7 and 8 have free space, the register unit 6 receives the write request of the CPU 1 and writes the first and second signals to the storages 7 and 8, respectively. In the case where the storages 7 and 8 do not have free space, the register unit 6 does not receive the write request of the CPU 1 until space becomes available, and the CPU 1 waits.

The command issuing unit 9 issues the SDRAM command indicated by the first signal written in the first storage 7 and waits only for the time of the minimum interval indicated by the second signal written in the second storage 8, since the SDRAM command is issued until the next SDRAM command is issued. During the period in which the command issuing unit 9 waits, the command issuing unit 9 does not output valid SDRAM commands. Invalid SDRAM commands include a no operation command NOP, and a device deselect command DES for fixing the chip select signal CS# at an inactivate level.

In other words, at the time of processing a command issue request entered by the n-th writing to the register unit 6, the command issuing unit 9 makes a check to see whether the "minimum interval" designated by the (n−1)th writing has elapsed since the SDRAM command issue by the n−1th writing to the register unit 6. The command issuing unit 9 waits until the designated interval is assured, and issues a command designated by the n-th writing.

The SDRAM 5 receives the SDRAM command issued by the command issuing unit 9 and performs an operation according to the received SDRAM command.

Figure 4:
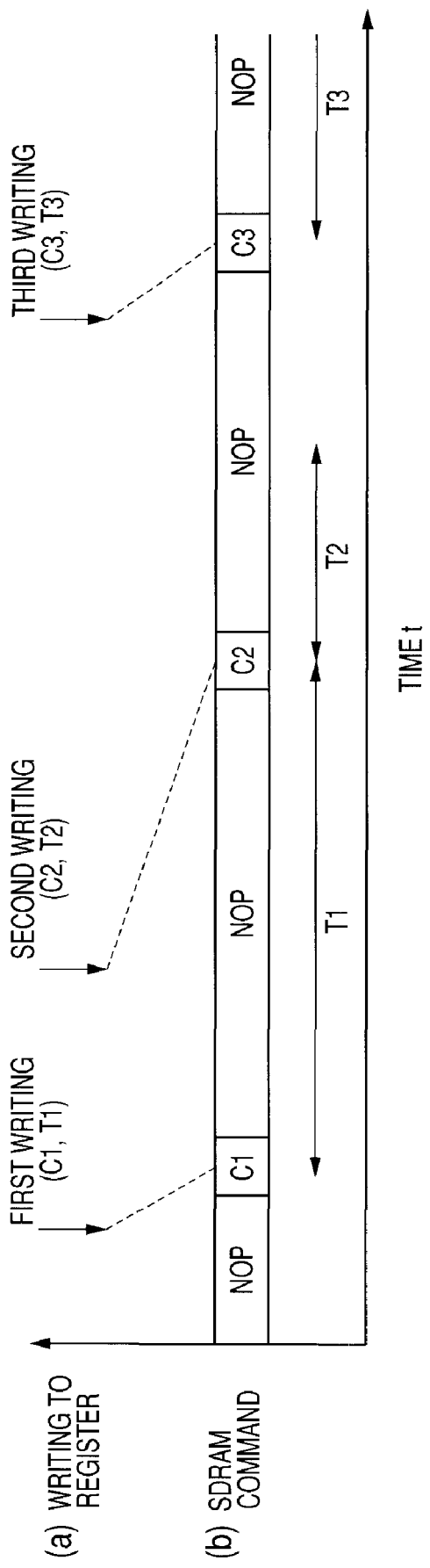
FIG. 4 is a time chart showing operations of the memory system illustrated in FIGS. 1 to 3.

FIGS. 4A and 4B are a time chart showing the command issuing sequence of the memory system. It is assumed that C1 is written as a command kind and T1 is written as the minimum interval by the first writing to the register unit 6. The command issuing unit 9 outputs the command kind C1 written in the register unit 6 to the SDRAM 5. Although there is the possibility that it takes time of a few cycles since the writing to the register 6 till output to the SDRAM 5, it is not a big issue.

It is assumed that, before time T1 elapses since the first command output, the second writing (a command kind C2 and a minimum interval T2) is performed to the register unit 6. In this case, until the interval T1 since the first command issue is assured, the second command issue is delayed.

It is assumed that the third writing (a command kind C3 and a minimum interval T3) to the register unit 6 is performed. In the case where the third writing timing is later than time after lapse of time T2 since the second command output as shown in FIGS. 4A and 4B, the designated command C3 is immediately output. By performing such a control, at least an interval equal to or longer than the minimum interval which is designated can be assured.

Figure 5:
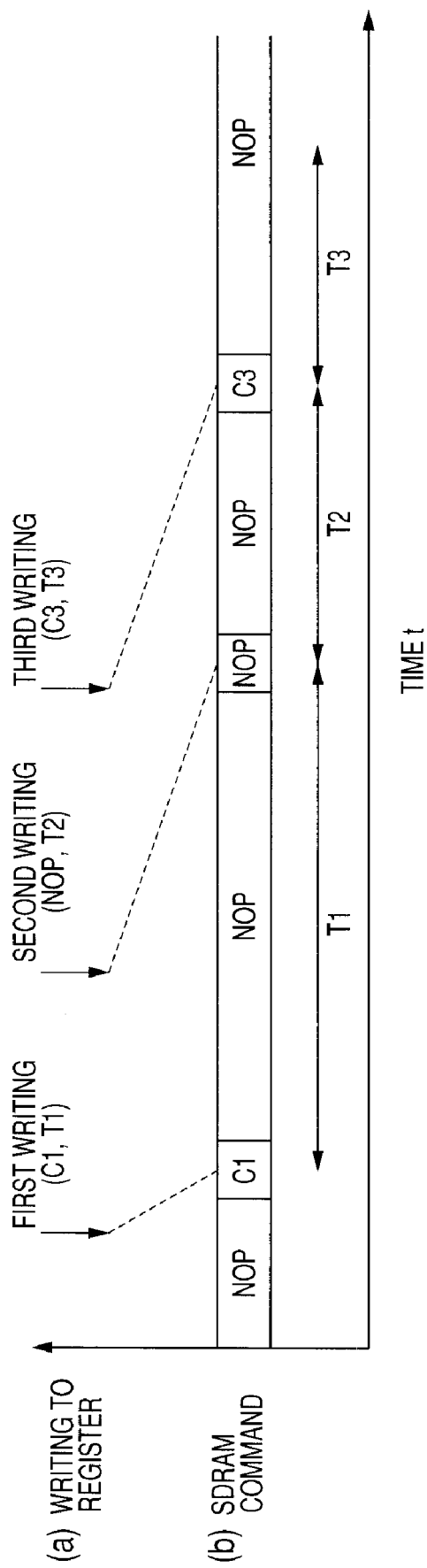
FIG. 5 is another time chart showing operations of the memory system illustrated in FIGS. 1 to 3.

As shown in FIGS. 5A and 5B, as a kind of the command, an NOP command can be also selected. By selecting the NOP command, wait time since power-on or start of supply of clocks until an effective command is output can be assured. In the case where the minimum interval desired to be designated is too long to be expressed by bit widths prepared in the register unit 6, the intervals can be added. For example, it is assumed that wait time of 500,000 cycles is desired to be assured and the value which can be designated as the minimum interval in the register unit 6 is up to 60,000 cycles. In this case, when writing of the command kind NOP and the minimum interval of 50,000 cycles to the register unit 6 is performed ten times, desired time can be assured.

Figure 6:
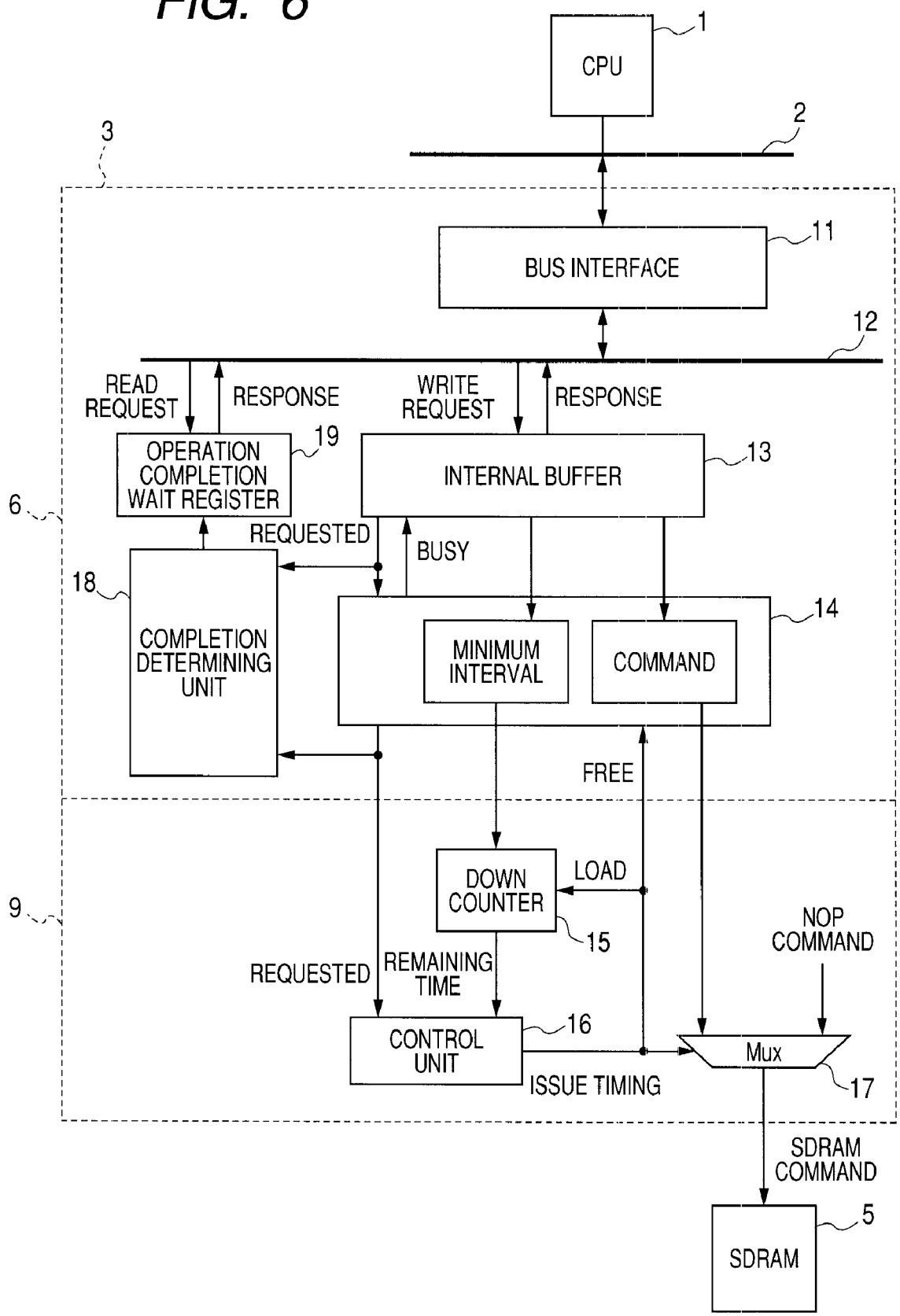
FIG. 6 is a block diagram showing a concrete configuration of an SDRAM controller illustrated in FIG. 3.
Figure 7:
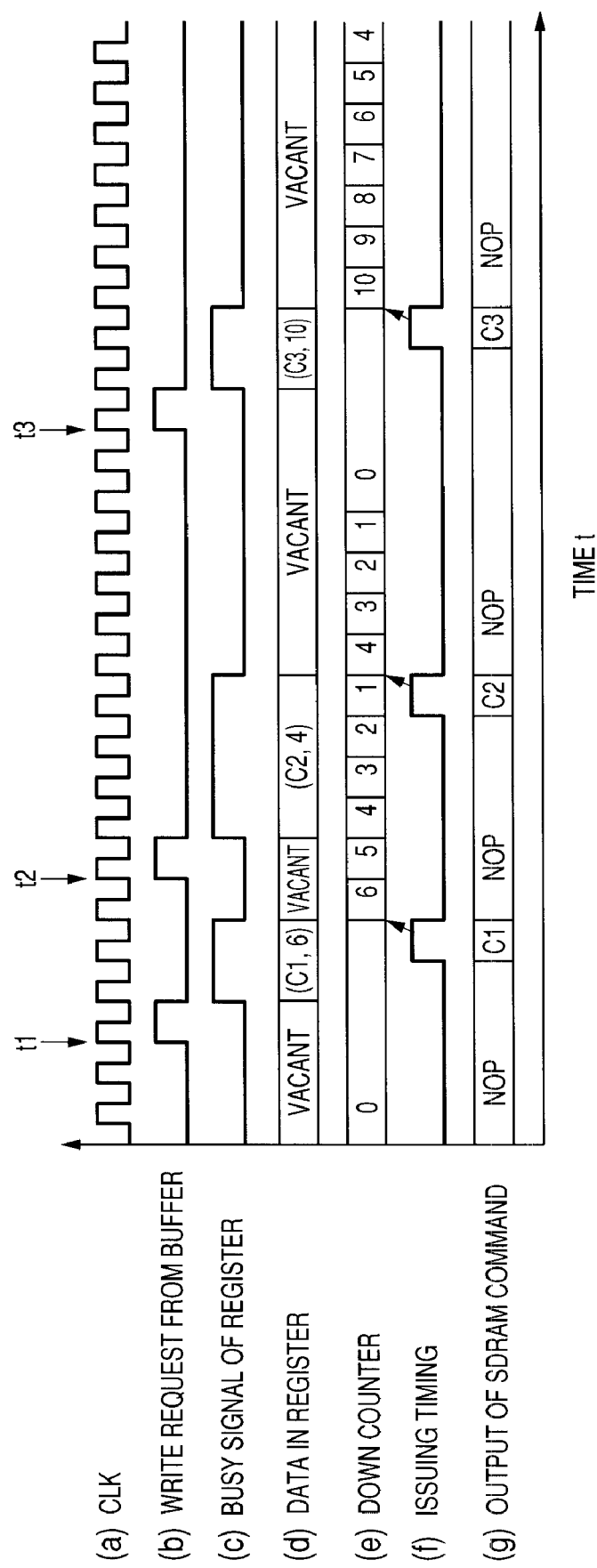
FIG. 7 is a time chart showing operations of the SDRAM controller illustrated in FIG. 6.

FIG. 6 is a block diagram showing a concrete configuration of the SDRAM controller 3. In FIG. 6, the SDRAM controller 3 has a bus interface 11, an internal bus 12, an internal buffer 13, a command issuing register 14, a down counter 15, a control unit 16, a multiplexer 17, a completion determining unit 18, and an operation completion wait register 19. The bus interface 11, the internal bus 12, the internal buffer 13, the command issuing register 14, the completion determining unit 18, and the operation completion wait register 19 configure the register unit 6. The down counter 15, the control unit 16, and the multiplexer 17 configure the command issuing unit 9.

The CPU 1 sends a write request to the SDRAM controller 3 via the system bus 2. The write request is given to the internal buffer 13 via the bus interface 11 and the internal bus 12. The internal buffer 13 receives the write request in the case where there is room to store a command issuing request (the SDRAM command and the minimum interval). In the case where there is no room, the internal buffer 13 does not receive the write request until room is created.

When the write request is received, an SDRAM command to be issued and the minimum interval (standby time) since the SDRAM command is issued until the next SDRAM command is issued are written from the CPU 1 to the internal buffer 13 via the system bus 2, the bus interface 11, and the internal bus 12.

The internal buffer 13 is provided to reduce time loss caused by handshake or the like of the bus protocol and buffers a plurality of sets of command issue requests (each made of the SDRAM command and the minimum interval). When there is room in the command issuing register 14, the command issue request held in the internal buffer 13 is transferred to the command issuing register 14. The command issuing register 14 holds the command issue request waiting for an issuing timing. The command issuing register 14 may be a register of a one-stage configuration or a register having a multi-state configuration such as an FIFO. The case of a register of a one-stage configuration will be described below. The "minimum interval" and "SDRAM command" held in the command issuing register 14 are supplied to the down counter 15 and the multiplexer 17, respectively.

The down counter 15 holds remaining time until the interval designated by the command issue of last time is finished. The count value is decremented every cycle. When the remaining time becomes zero, the count value is not decremented. When the command issue request is supplied to the command issuing register 14 and the remaining time output from the down counter 15 is zero (or sufficiently small), the control unit 16 outputs a pulse signal indicative of a command issue timing.

In response to the pulse signal, the down counter 15 loads the value of the "minimum interval" held in the command issuing register 14 and starts down-counting in preparation for issuing the next command. The multiplexer 17 receives the SDRAM command from the command issuing register 14, outputs the SDRAM command from the command issuing register 14 for only one cycle in response to a pulse signal, and outputs an invalid SDRAM command (for example, NOP command) in the other cycles. In response to the pulse signal, data stored in the command issuing register 14 is erased so that a free space is created.

The completion determining unit 18 determines whether all of command issue requests loaded to the SDRAM controller 3 have been handled and output to the SDRAM 5 or not. After lapse of predetermined time (time corresponding to latency from the command issuing register 14 to the SDRAM) after both of the internal buffer 13 and the command issuing register 14 becomes empty, an output signal of the completion determining unit 18 becomes true (for example, the "H" level). When a new command issue request is loaded to the internal buffer 13 or the command issuing register 14, an output signal of the completion determining unit 18 becomes false (for example, the "L" level). To a read request from the CPU 1, when the output signal of the completion determining circuit 18 is true, the operation completion wait register 19 immediately sends a reply. However, while the output signal is false, the operation completion wait register 19 does not send a reply. Consequently, the interval between a timing which is not controlled by the SDRAM controller 3 (such as interruption of a clock or power) and an SDRAM command issue can be also assured accurately.

In place of the operation completion wait register 19, a status register for immediately sending to a signal indicating whether the output signal of the completion determining circuit 18 is true or false in response to the read request of the CPU 1 may be provided. It is also possible to eliminate the operation completion wait register 19 and supply an output signal of the completion determining unit 18 directly to the CPU 1.

FIGS. 7A to 7G are a time chart showing a command issue sequence of the memory system illustrated in FIG. 6. At time t1, a write request is sent from the internal buffer 13 to the command issuing register 14. Since the command issuing register 14 has free space, the SDRAM command C1 to be issued and the minimum interval T1=6 are written from the internal buffer 13 to the command issuing register 14. Since the count value of the down counter 15 is zero, a pulse signal indicative of an issue timing is output, and the SDRAM command C1 is output to the SDRAM 5. In response to the pulse signal indicative of the issue timing, the minimum interval T1=6 is loaded to the down counter 15. The down counter 15 starts down-counting. Data in the command issue register 14 is erased, and the register 14 becomes empty. A busy signal indicating that the register 14 is not empty becomes the "L" level which is an inactive level.

At time t2 before lapse of the minimum interval T1=6 after the first command output, the write request is sent from the internal buffer 13 to the command issue register 14, and the second writing (the command kind C2 and the minimum interval T2=4) to the register 14 is performed. In this case, the command issue of the second time is delayed until the minimum interval T1=6 since the command issue of the first time is assured.

Further, at time t3 after lapse of the minimum interval T2=4 after the command output of the second time, a write request is sent from the internal buffer 13 to the command issue register 14, and writing (the command kind C3 and the minimum interval T3=10) of the third time is performed. In this case, the minimum interval T2 has already lapsed since the command output of the second time, so that the designated command C3 is immediately output. By performing such a control, at least the designated minimum interval can be assured.

In the embodiment, the CPU 1 sequentially designates a series of SDRAM commands in accordance with a program (software). Hardware (the SDRAM controller 3) counts the intervals of the SDRAM commands. Consequently, without complicating the specifications of the hardware so much, the device can be made adapted to the SDRAMs 5 of various kinds and control methods by changing software. In this case, simple software for continuously writing data to the register unit 6 is sufficient. It is unnecessary to measure time on the software side by a timer and a wait loop. Therefore, the invention is particularly effective in an LSI desired to be compatible with number of kinds of SDRAMs. If this is not the case, there are effects that reusability of hardware improves and the number of designing and verifying processes is decreased.

Figure 8:
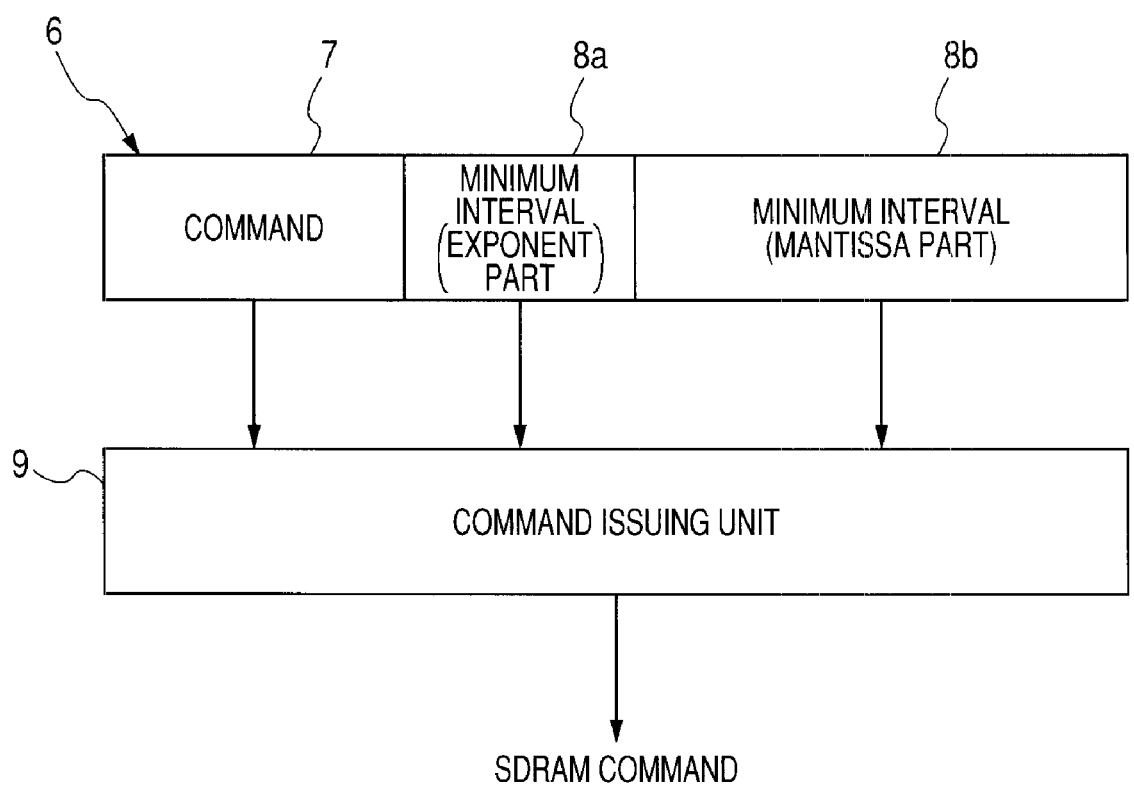
FIG. 8 is a block diagram showing a modification of the embodiment.

FIG. 8 is a block diagram showing a modification of the embodiment and is compared with FIG. 3. Referring to FIG. 8, in the modification, the minimum interval between commands is written in the register unit 6 by a floating point method. In the floating point method, the minimum interval T is expressed by a mathematical equation of $T=B \times 2^{KA}$ where K denotes a constant which is, for example, 4, "A" denotes an exponent part, and B denotes a mantissa part. The second storage 8 in the register unit 6 includes a first storage area 8a in which the exponent part "A" of the minimum interval T is written, and a second storage area 8b in which the mantissa part B of the minimum interval T is written. In the modification, the wait time T in a wide range can be set with the small bit width.

Figure 9:
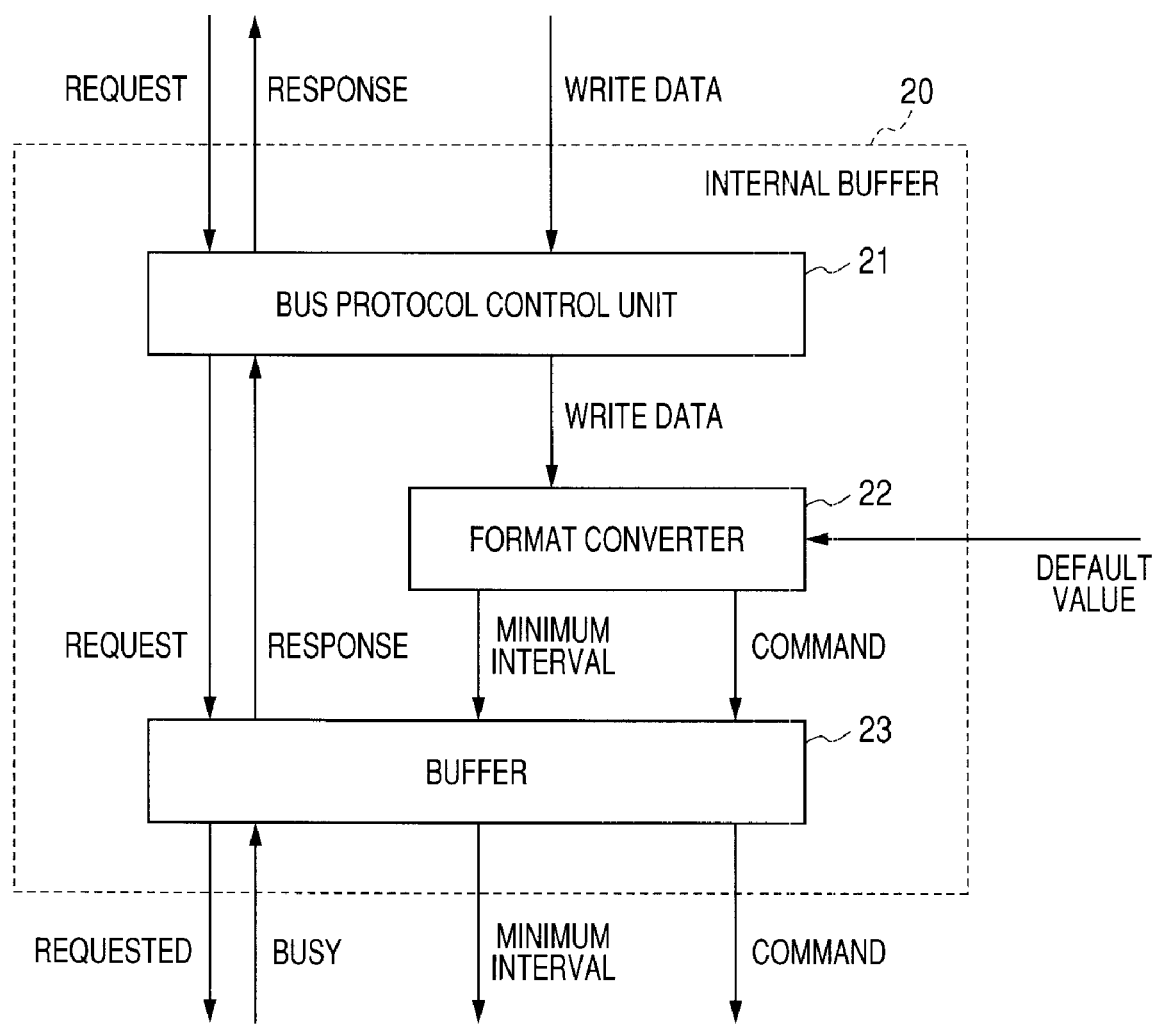
FIG. 9 is a block diagram showing another modification of the embodiment.

FIG. 9 is a block diagram showing another modification of the embodiment. In the modification of FIG. 9, the internal buffer 13 in FIG. 6 is replaced with an internal buffer 20. Depending on the kinds of SDRAMs (mode register set, refresh, ZQ calibration, or the like), the SDRAM 5 does not accept a new SDRAM command for a predetermined period after an SDRAM command is issued. In the modification, in the case where a value designated in an "interval" field is a special value (for example, all bits "0") by writing from the CPU 1, the value is replaced with a default value and the default value is written in the command issuing register 14. The default value is selected according to the kind of the command designated in the writing.

Specifically, the internal buffer 20 includes a bus protocol control unit 21, a format converter 22, and a buffer 23. In the case where there is a write request from the CPU 1, when the buffer 23 has free space, the bus protocol control unit 21 receives the write request. When the buffer 23 does not have free space, the bus protocol control unit 21 does not accept the write request until a free space is created. When the write request is accepted, the command and the minimum interval are written in the format converter 22.

The format converter 22 checks the written command and minimum interval. When the minimum interval is the special value, the default value determined according to the kind of the command is output as the minimum interval to the buffer 23. The default value is given from the outside of the internal buffer 20 (for example, the CPU 1) in order to increase flexibility and re-usability of the circuit. The format converter 22 outputs the command as it is to the buffer 23. As shown in FIG. 6, the minimum interval held in the buffer 23 is given to the down counter 15, and the command is given to the multiplexer 17. In the modification, the flexibility and re-usability of the circuit can be further increased. The command is output via the format converter 22. It is intended to output the command and the minimum interval to the buffer 23 at the same input timing. For example, the timings can be adjusted by a simple circuit such as a flip flop.

It should be understood that the embodiments disclosed are illustrative and not restrictive in all respects. The scope of the invention is defined by the claims rather than by the above description and all changes that fall within meets and bounds of the claims or equivalence of such meets and bounds are intended to be within the scope of the invention.

What is claimed is:

1. A memory control device for controlling a semiconductor memory by issuing a series of commands, comprising:
a register to which a command to be issued and wait time for issue of the next command since the command to be issued is issued are written by an external control device;
a command issuing unit that stops issuing the next command until the wait time written in the register elapses after the command written in the register is issued, and
a determining unit for determining whether issue of a command written in the register has been completed or not,
wherein en an inquiry of whether issue of the command is completed or not is received from the external control device, the determining replies whether issue of the command has been completed or not.

2. The memory control device according to claim 1, wherein the command issuing unit also issues an NOP command for instructing waiting without performing anything on the semiconductor memory.

3. The memory control device according to claim 1, wherein the wait time is expressed by a floating point method.

4. The memory control device according to claim 1, wherein when a predetermined value is written as the wait time, the command issuing unit stops issuing the next command until time determined by the command written in the register elapses.

5. The memory control device according to claim 1, wherein a request to access a specific address received from the external control device is not responded until issue of the command is completed.

* * * * *